(12) United States Patent
Schilles

(10) Patent No.: US 7,997,894 B2
(45) Date of Patent: Aug. 16, 2011

(54) PRESS MOLDING TOOL AND METHOD FOR PRODUCTION OF A COMPONENT BY PRESS MOLDING

(75) Inventor: Wilfried Schilles, Zuelpich Schwerfen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 161 days.

(21) Appl. No.: 11/662,944

(22) PCT Filed: Aug. 31, 2005

(86) PCT No.: PCT/DE2005/001523
§ 371 (c)(1),
(2), (4) Date: Apr. 2, 2008

(87) PCT Pub. No.: WO2006/029588
PCT Pub. Date: Mar. 23, 2006

(65) Prior Publication Data
US 2009/0096127 A1    Apr. 16, 2009

(30) Foreign Application Priority Data

Sep. 18, 2004  (DE) .................. 10 2004 045 398
Sep. 18, 2004  (DE) .................. 10 2004 045 399
Sep. 18, 2004  (DE) .................. 10 2004 045 400

(51) Int. Cl.
*B28B 3/00* (2006.01)
(52) U.S. Cl. ........ 425/517; 425/235; 425/304; 425/510; 425/520
(58) Field of Classification Search .......... 425/304, 425/510, 235, 517, 520
See application file for complete search history.

(56) References Cited

U.S. PATENT DOCUMENTS

| 4,242,074 A | * | 12/1980 | Lake | 425/292 |
| 4,243,456 A | * | 1/1981 | Cesano | 264/161 |
| 5,759,594 A | * | 6/1998 | Masui et al. | 425/510 |
| 6,136,415 A | | 10/2000 | Spengler et al. | |

(Continued)

FOREIGN PATENT DOCUMENTS

DE    2 360 239    6/1974

(Continued)

OTHER PUBLICATIONS

Japanese Office Action dated Apr. 27, 2010 corresponding to Japanese Patent Application No. 2007-531582.

(Continued)

*Primary Examiner* — Yogendra Gupta
*Assistant Examiner* — Alison Hindenlang
(74) *Attorney, Agent, or Firm* — Crowell & Moring LLP

(57) ABSTRACT

The invention relates to a press molding tool for the production of a component from at least one first material layer (1) and a second material layer (2) with a molding tool, determining the shape of the component for production with two tool pieces (11, 12), to carry out the forming of the first material layer (1) and the second material layer (2) as well as the connection of both material layers by bringing together the first and second tool piece, and with a clamping frame device which comprises a first (21), a second (22) and a third (23) clamping frame element, a cutting device (100) arranged on the third clamping frame element for cutting a projection of the second layer extending between the first and the second tool piece, and method for production of a component.

20 Claims, 11 Drawing Sheets

U.S. PATENT DOCUMENTS

| | | | |
|---|---|---|---|
| 6,328,549 B1 * | 12/2001 | Valyi et al. | 425/112 |
| 2002/0162213 A1 * | 11/2002 | Saelen et al. | 29/566.1 |

FOREIGN PATENT DOCUMENTS

| | | |
|---|---|---|
| DE | 29 25 500 | 1/1980 |
| DE | 29 25 500 A1 | 1/1980 |
| DE | 79 06 115 U1 | 8/1980 |
| DE | 30 30 537 A1 | 3/1982 |
| DE | 33 38513 A1 | 5/1985 |
| DE | 43 05 189 A1 | 8/1994 |
| DE | 44 19 908 A1 | 12/1995 |
| DE | 196 29 196 A1 | 1/1998 |
| GB | 1 440 935 | 6/1976 |
| GB | 1 440 935 A | 6/1976 |
| GB | 1 505 255 A | 3/1978 |
| JP | 49-90352 | 8/1974 |
| JP | 51-102059 A | 9/1976 |
| JP | 55-005900 | 1/1980 |

OTHER PUBLICATIONS

Indian Office Action dated Jan. 11, 2011 (4 pages).

* cited by examiner

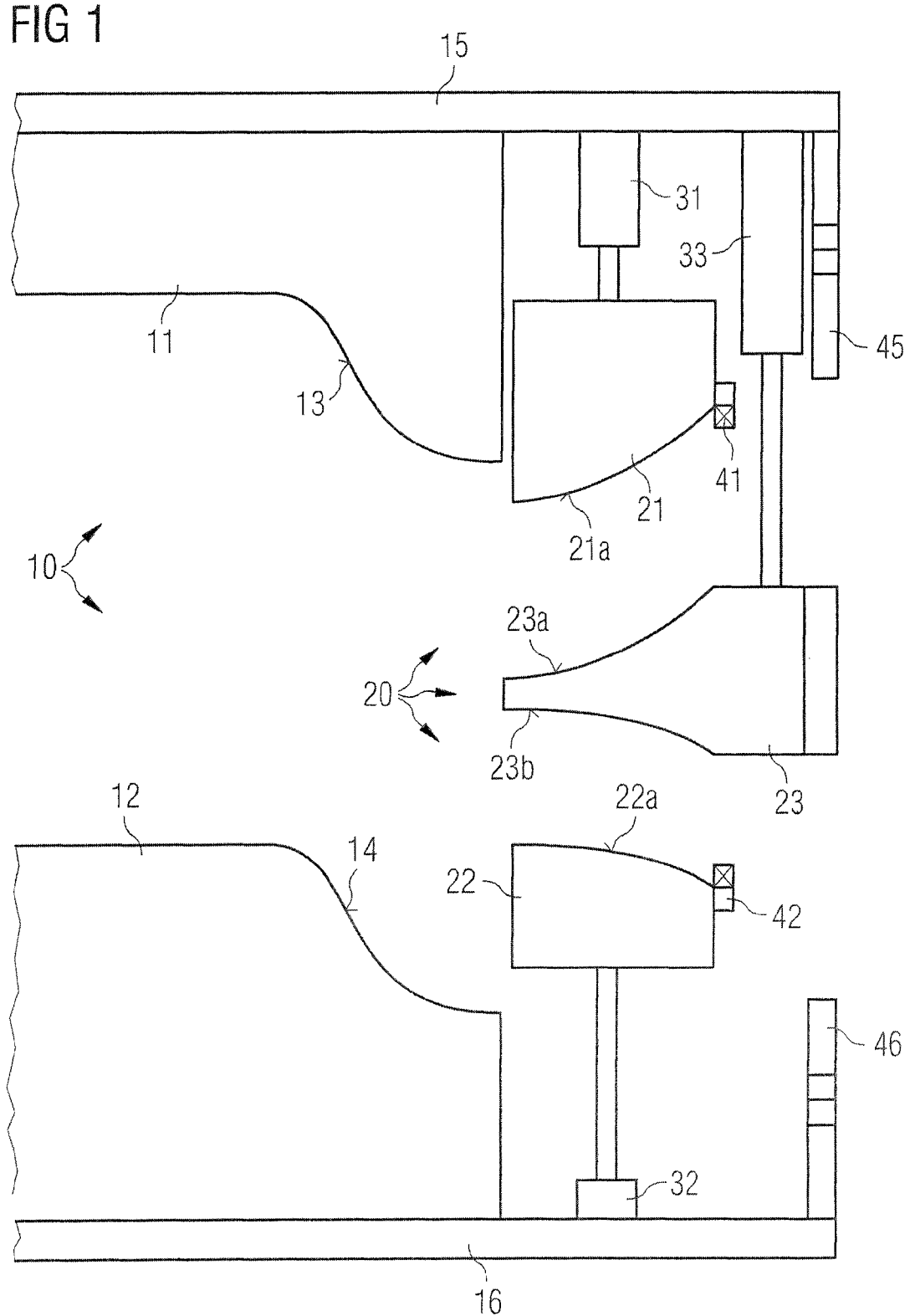

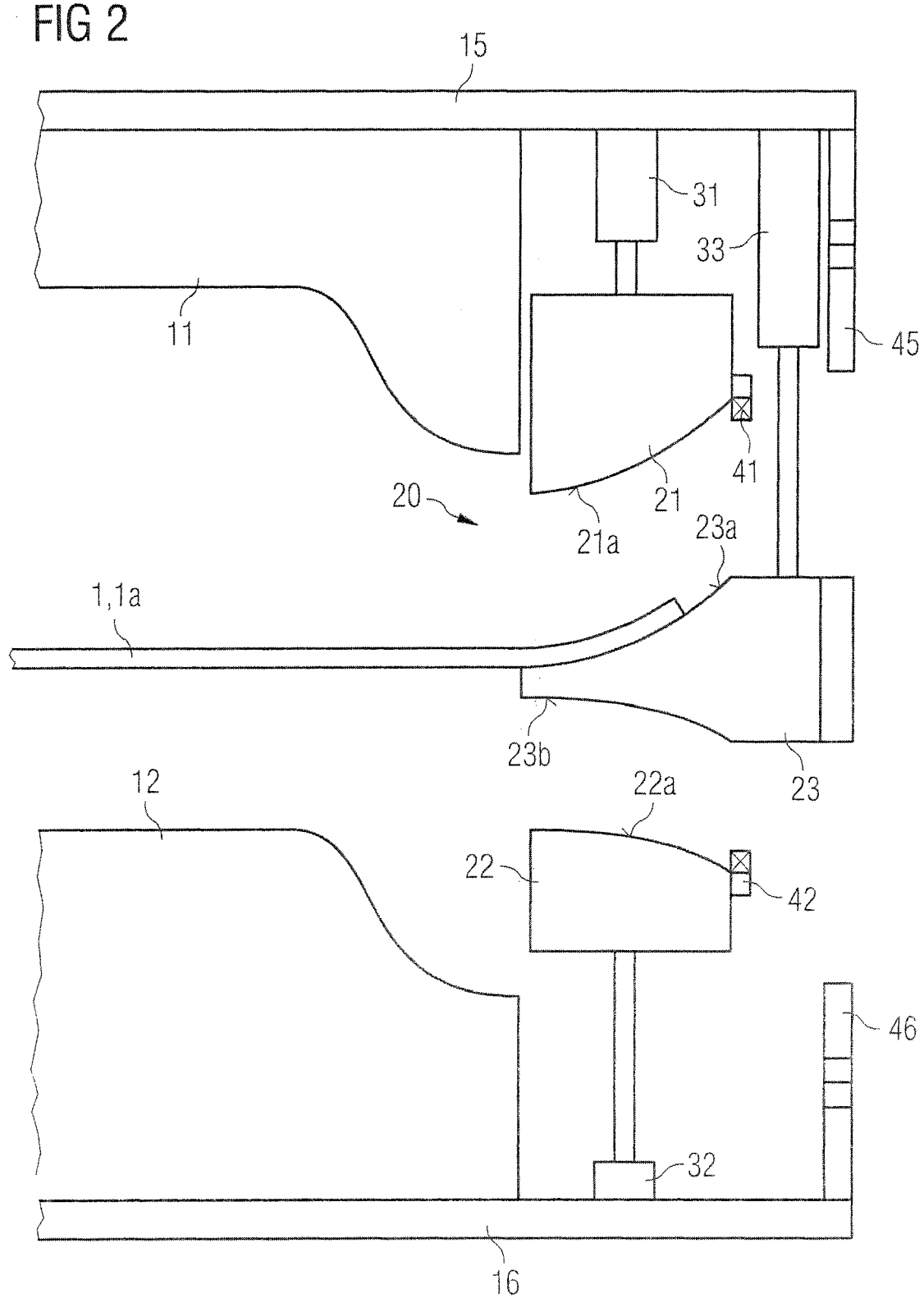

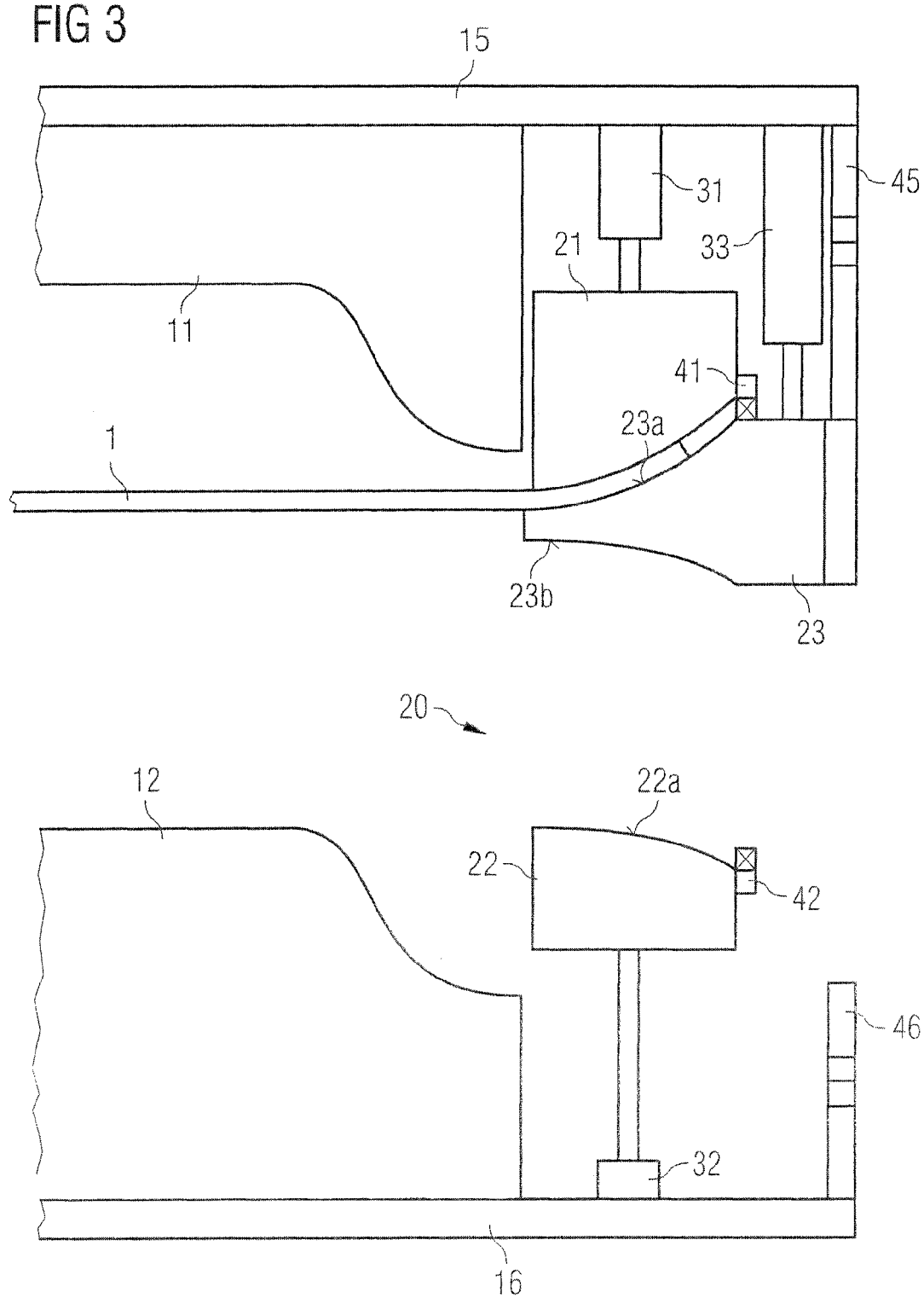

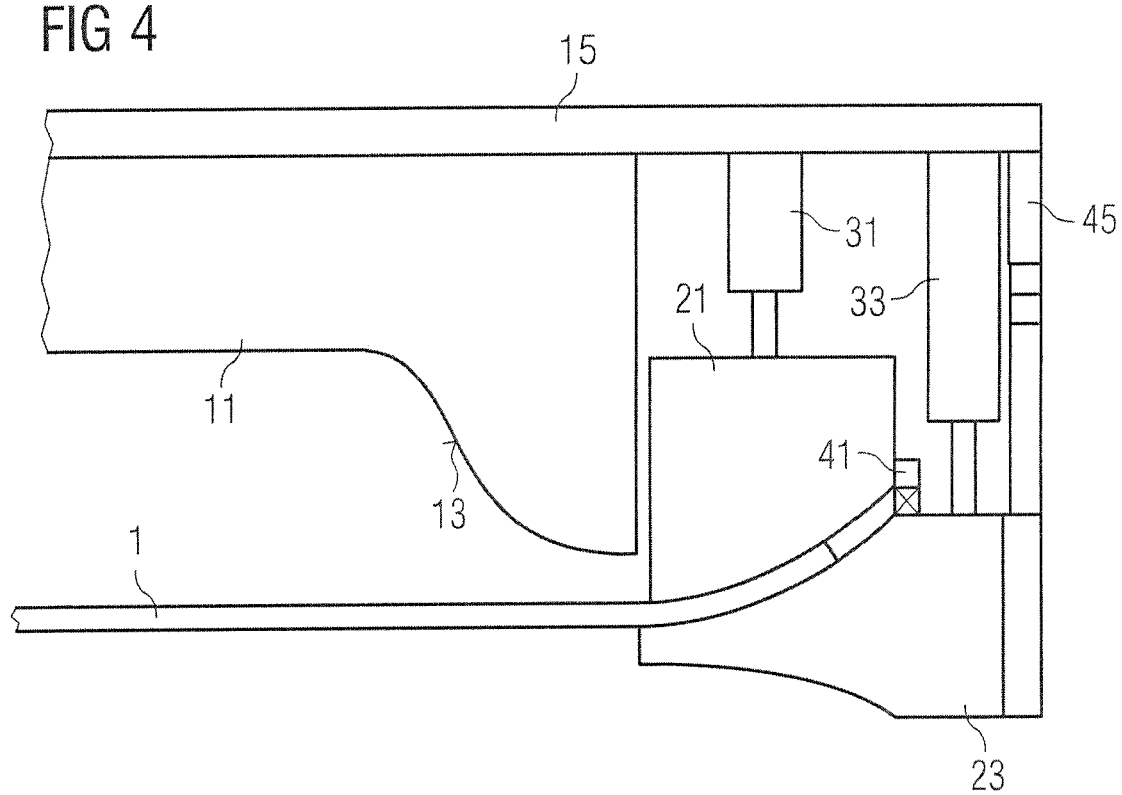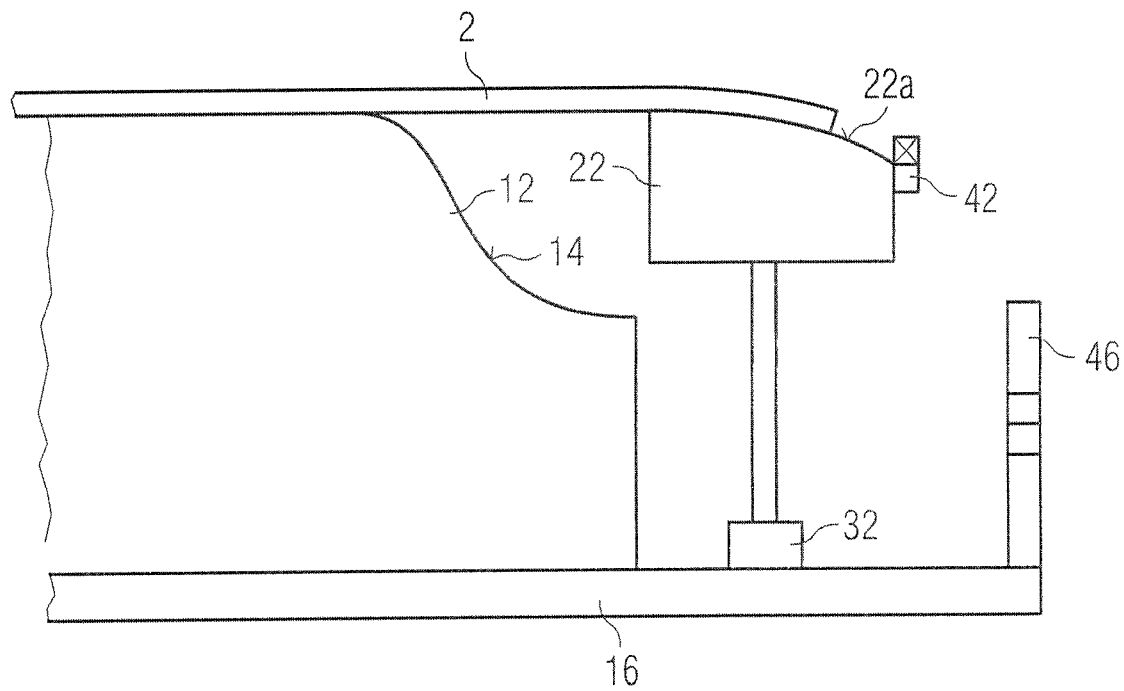

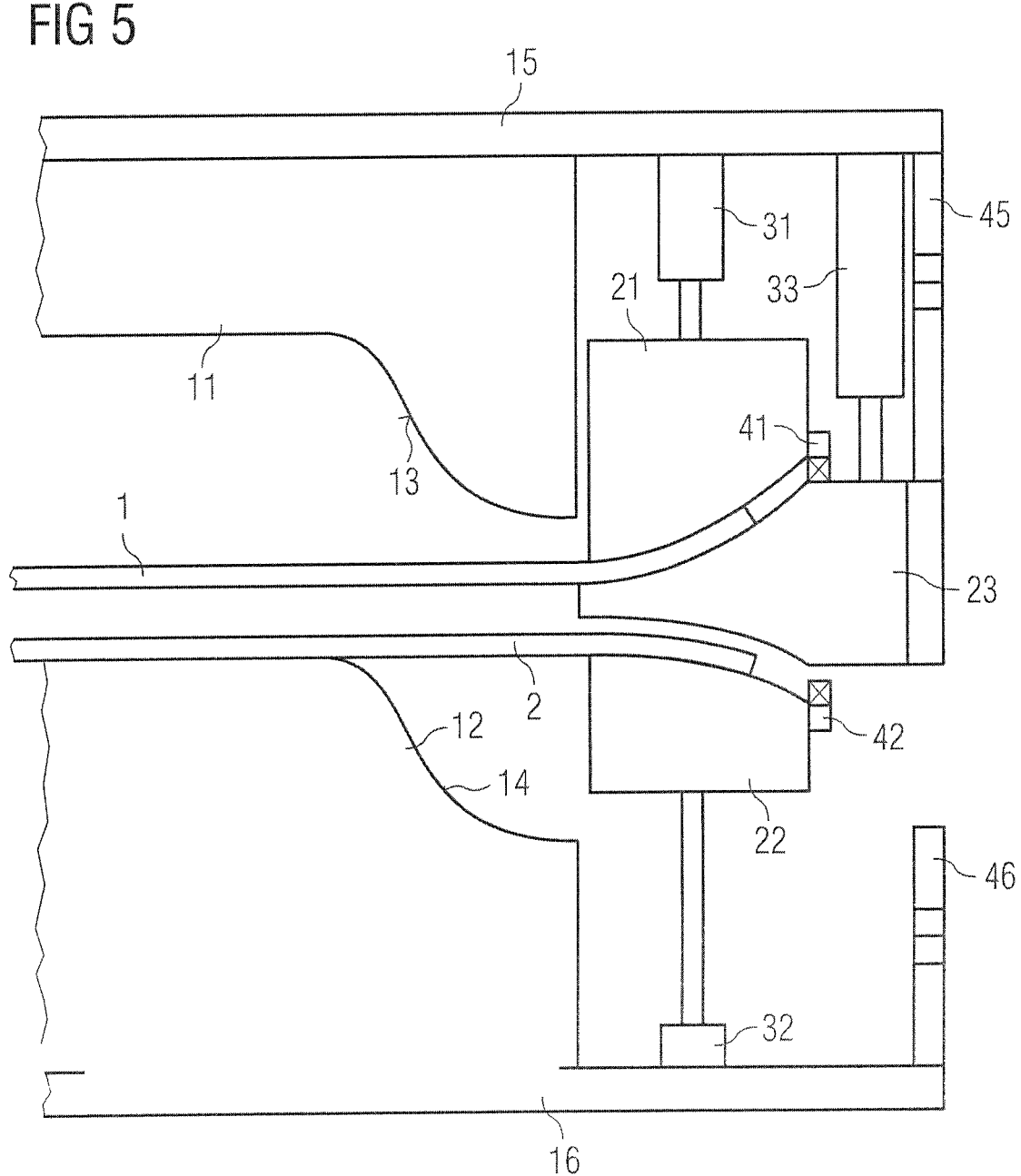

PRESS MOLDING TOOL AND METHOD FOR PRODUCTION OF A COMPONENT BY PRESS MOLDING

The invention relates to a press molding tool and to a method for production of a component by press molding.

One of the two layers can be, in particular, a support layer and the other of the two layers can be, in particular, a decoration layer.

For production of components of this type, it is known from the prior art to use an upper tool and a lower tool in order to mold a support layer and a decoration layer into a predetermined component shape by pressing them together and in order to connect them to each other. During the molding of the layers into a component shape with a three-dimensional curvature or contour, there is the problem that the materials tend to crease when the upper tool and the lower tool are moved together. These creases are then permanently pressed into the materials and result in the component produced not being able to be used. For this reason, use is made of a clamping frame with which the decorative material or the mat is clamped and is held in a predetermined manner in order to prevent creases from forming on the component in the region between the lower tool and the upper tool.

In the case of the apparatuses of the type in question and in the case of single-stage production processes of this type, the support layer in the form of a heated mat and the decoration layer are placed onto each other before they are shaped by lower tool and upper tool or are pressed against each other by an optionally used clamping frame. There is the further problem, in the apparatuses of the prior art, that the layers to be molded and to be connected to one another may become stuck to one another in some sections, as a result of which the layers are then partially connected to one another. During subsequent trimming of the decoration layer and support layer, in which an excess length of the decoration layer is to be achieved, it is no longer possible to separate the layers in some sections, and therefore the component is not usable for subsequent bending of the decoration layer. A complicated finishing operation is possibly required in order to make the component suitable for the intended use envisaged and in particular to make it suitable for bending.

It is the object of the invention to provide a method and an apparatus with which a better quality of the surface of the component to be produced and of the technical properties of the support layer is achieved with great reliability.

This object is achieved by the features of the independent claims. Further embodiments according to the invention are described in the subclaims which refer back to said independent patent claims.

It is provided for the production according to the invention of a component that, after the first layer, for example the decoration layer, is placed into the tool, the first layer is held outside the contour-shaping region of the tool by the first and the third clamping frame element, that the second clamping frame element, the third clamping frame element and the second tool part can be assigned to one another in such a manner that, when the tool parts move together, first of all the second layer, for example the support layer, is fixed outside the contour-shaping region of the tool by means of the second clamping frame element and the third clamping frame element while the support layer and the decoration layer are molded and connected to each other within the tool upon closing thereof.

According to the invention, a method is provided for production of a component by press molding of a first and of a second material layer, during which the two layers are connected within the molding contours of two tool parts by moving the latter together, the first tool part and the second tool part having been moved apart in an initial position, with the following steps:

(a) moving a first clamping frame element and a second clamping frame element into an extended position with respect to each other and placing the first layer between the two tool parts and between the first and a third clamping frame element, which is arranged between the first and the second clamping frame elements, and placing the second layer between the two tool parts and between the second clamping frame element and the third clamping frame element, with the first, second and the third clamping frame elements being arranged outside the molding contour of the tool parts, (b) moving the first clamping frame element, second clamping frame element and the third clamping frame element into a position in which the first layer and the second layer are held by the first clamping frame element and the third clamping frame element and, respectively, by the second clamping frame element and the third clamping frame element, (c) moving the tool parts together relative to each other with molding of the first and of the second layers in the region of the molding contours of the tool parts, (d) moving the tool parts and the clamping frame elements apart in order to be able to remove the interconnected first and second layers from the tool.

In step (b), the second and the third clamping frame elements are moved into a relative position with respect to each other in which the second layer can continue to flow in a predefined manner during molding of the layers, or continued flowing can be inhibited. Furthermore, in step (b), the second and the third clamping frame elements can be moved into a relative position with respect to each other in which the first layer can continue to flow in a predefined manner during the molding of the layers, or continued flowing can be inhibited. It can be provided that, when the first, second and third clamping frame elements are moved together in step (b), the distance between the first and third clamping elements and between the second and third claming elements is set by means of spacers.

Furthermore, according to the invention, a press molding tool is provided for production of a component from at least one first material layer and one second material layer with at least one first tool part and one second tool part each having a three-dimensional molding contour, wherein, when the first material layer and the second material layer are placed into the apparatus, the molding contour of the first tool part faces the first material layer and the molding contour of the second tool part faces the second material layer, wherein the tool parts are clamped in a pressure transducer in order to bring about the molding of the first material layer and of the second material layer and the connection of the two material layers to each other by moving the first and the second tool parts together, and with a clamping frame device in order to hold the material layers in their closed position outside the contour region of the tool during the molding operation, the clamping frame device comprising:

a first clamping frame element which is movable relative to the first tool part by means of a first adjusting device, a second clamping frame element which is movable relative to the second tool part by means of a second adjusting device, a third clamping frame element which is movable relative to the first or second tool part by means of a third adjusting device and is arranged between the first and the second clamping frame elements.

The first, the second and the third clamping frame elements are therefore arranged in such a manner that a material for the first layer can be placed between the first clamping frame element and the third clamping frame element, and a material for the second layer can be placed between the second clamping frame element and the third clamping frame element, and therefore the layers can be held separately from each other by means of the third clamping frame element. At least one distance element or a spacer can be arranged on the third clamping frame element and is used to predetermine the minimum distance between the first and third clamping frame elements and between the second and third clamping frame elements.

The solution according to the invention makes it possible to produce components which have a support layer of uniform thickness, and therefore the technical properties of the entire component are improved with great reliability.

In the curvature which occurs of the decoration layer and support layer when the lower tool and the upper tool are moved together, a stress is produced in the layers due to the different lengths of the development of the contour lines of the layers on the contour surfaces of lower tool and upper tool from a preferably planar initial state. Said stress is compensated for according to the invention by the layers being able to continue to flow from the outside into the tool region in a defined manner and in a manner largely free from stresses and creases.

The effect achieved by the apparatus according to the invention is that those layers which are situated in the clamping frame region outside the contour-shaping region of the tool are not connected to one another before trimming of the edge lines. As a result, bending regions remain reliably separated from one another before the layers are to be cut off in such a manner that an excess material length in comparison to the edge line of the support layer is achieved for the formation of a bend, which formation is optionally provided in a further step.

The invention is described below with reference to the attached drawings, in which:

FIG. 1 shows an embodiment of the production apparatus according to the invention in a first or basic position, in which the molding tool is in an open position and a first and a second clamping frame element of three clamping frame elements are moved apart;

FIG. 2 shows the embodiment of the production apparatus according to the invention as per FIG. 1 in a state in which a first layer is accommodated;

FIG. 3 shows the embodiment of the production apparatus according to the invention as per FIG. 1 with a second position of the clamping frame elements, in which the first layer is held by the first and the third clamping frame elements;

FIG. 4 shows the embodiment of the production apparatus according to the invention as per FIG. 1 in a state in which, furthermore, a second layer is accommodated;

FIG. 5 shows the embodiment of the production apparatus according to the invention as per FIG. 1 with a first tool intermediate position and a third position of the clamping frame elements;

Figure 9:
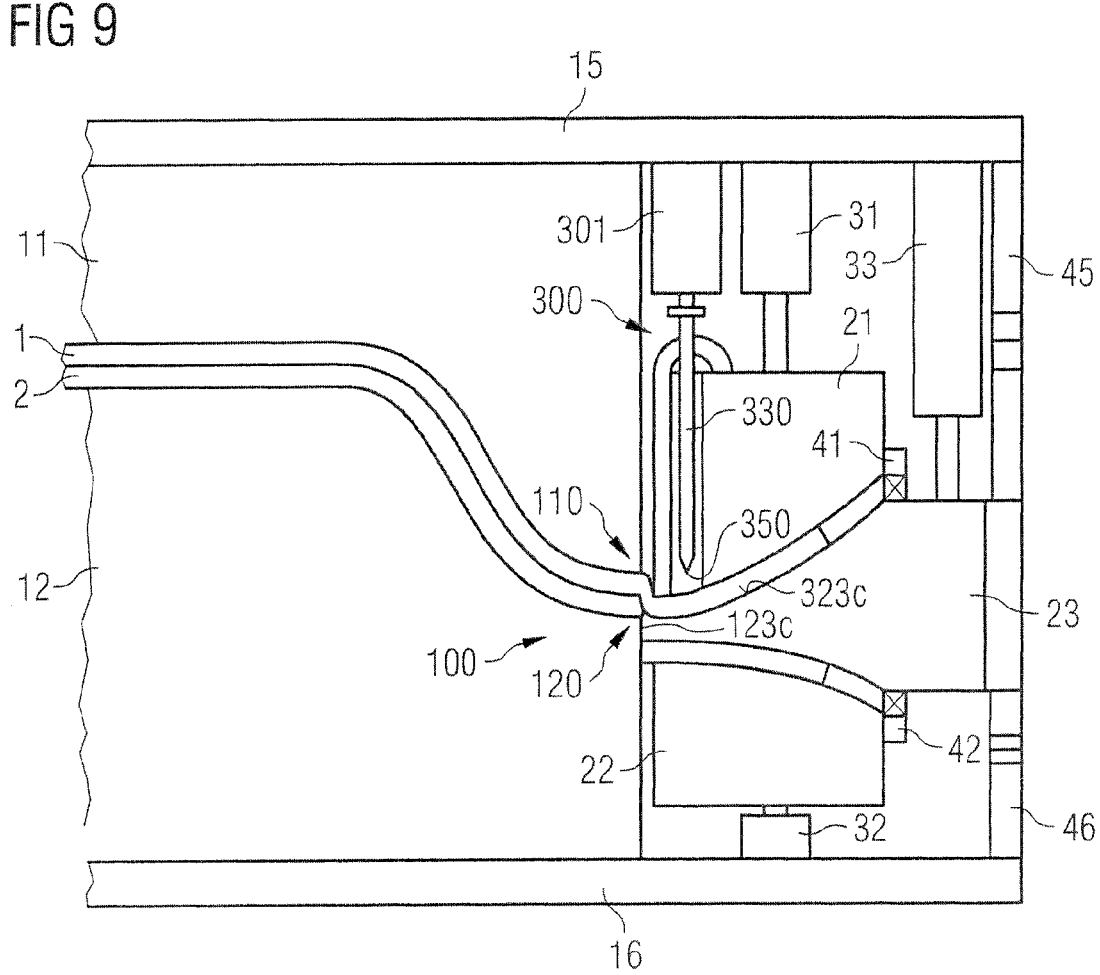
Figure 10:
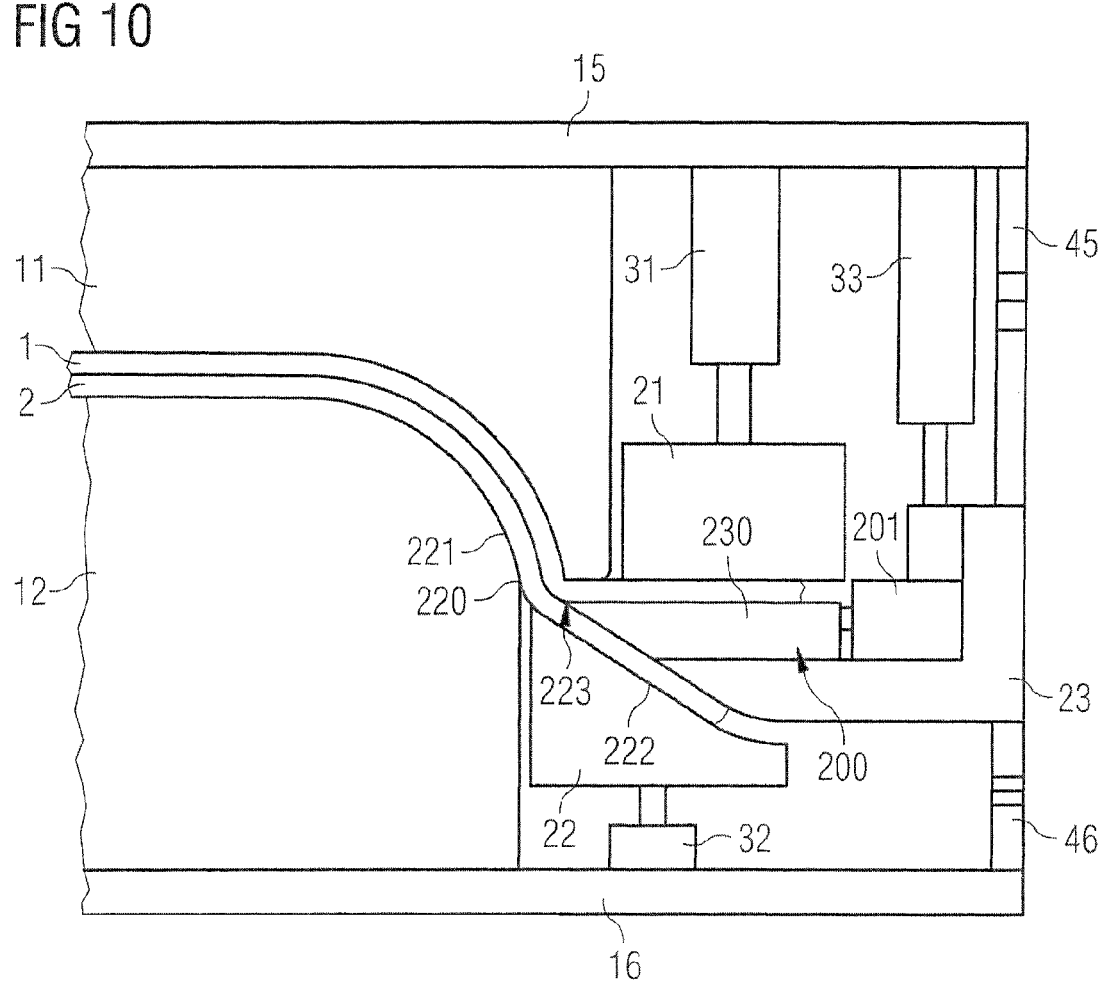
Figure 11:
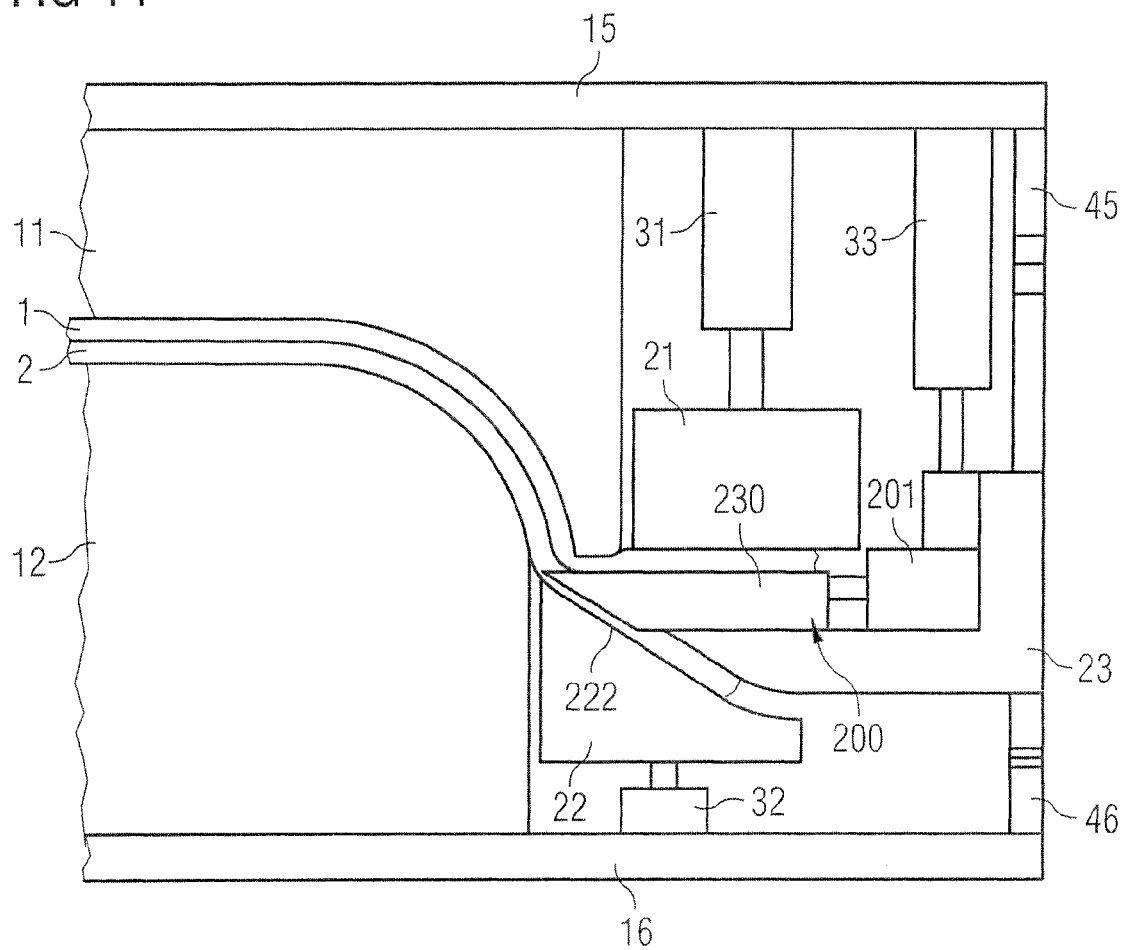

FIG. 9 shows the embodiment of the production apparatus according to the invention as per FIG. 1 with a first cutting apparatus as part of the second clamping frame element in a state in which an excess length of the second layer is cut off, and with a further cutting apparatus, which is arranged on the first clamping frame element, in a state in which an excess length of the second layer is cut off;

FIG. 10 shows the embodiment of the production apparatus according to the invention as per FIG. 1 with a further cutting apparatus, which is arranged on the third clamping frame element, in a state before the cutting operation;

FIG. 11 shows the embodiment of the production apparatus according to the invention as per FIG. 1 with a further cutting apparatus, which is arranged on the third clamping frame element, in a state after the cutting operation.

The method according to the invention and the apparatus according to the invention relate to the production of a component from at least one first layer, for example a decoration layer, and one second layer 2, for example a support layer, in which molding of the first layer and of the second layer and the connection of the two layers to each other take place by moving together a first tool part, which faces the first layer, and a second tool part, which faces the second layer. In general, both layers can be multi-layered, with it also being possible for a plurality of layers of the first layer or of the second layer to be molded and connected to one another by the method and the apparatus according to the invention. In the description below, a single- or multi-layered layer, which is intended for bearing against the contour-shaping region of the first tool part, is referred to as the first layer. Analogously, a single- or multi-layered layer, which is intended for bearing against the contour-shaping region of the second tool part, is referred to below as the second layer. In general, the first and the second layers are layers which can be connected to one another under pressure, for example can be fused or inter-locked at least in some regions.

One of the two layers in the component to be produced is preferably a decoration layer and the other of the two layers is a support layer. Embodiments of the invention are described below, in which the first layer is a decoration layer and the second layer is a support layer. However, it is also possible that, conversely, the first layer is a support layer and the second layer is a decoration layer. Also, one of the two layers does not have to be a decoration layer or support layer. For example, the first and the second layers can be two support layers or two intermediate layers or one support layer and a reinforcing layer, such as, for example, a layer made of glass cloth.

In the case of production of the component with a support layer and a decoration layer, the mutually facing sides of the decoration layer and of the support layer have to be connectable to each other by pressure exerted by the tool and, if appropriate, with the use of heat. For this purpose, that layer of the decoration layer which faces the support layer can have the property of connecting mechanically to the support layer under pressure, for example by mechanical inter-locking of threads or hairs provided on the mentioned side of the decoration layer with the possibly fused-on surface of the support layer. For this purpose, at least the surface of the decoration layer, which surface faces the support layer, can be formed from a woven cloth which can be, for example, a fleece, a felt, a flat cloth, or a circular knit. The decoration layer can also be connected to the support layer by fusing the mutually facing surfaces with the use of pressure by the tool and, if appropriate, with the use of heat. Fusing is achieved if the decoration layer contains foam constituents which belong to the same family of materials as the support layer provided for the fusion.

As the decoration layer, use can be made here of a textile cloth, an expanded leather cloth, a plastics sheet or a leather. If a textile cloth is used as the decoration layer, a layer of textile materials or sheets or a combination of the alternatives mentioned can be used for the starting material. In the case of the component to be produced, a decoration layer can also be provided in order to optimize the haptic properties of the end product on the corresponding side of the component. For this purpose, the decoration layer can also have foam constituents. For example, the decoration layer can be a composite of textile materials, a foam and a fleece material. The foam used can be a PP foam or PE foam or a foam built up on PU.

As the support layer, in particular a plastic and especially a polypropylene (PP)-bound fiber mat is provided. Said support layer can be in particular plasticized by the supply of heat. The support layer is preferably formed from a fiber material, preferably of natural fibers or glass fibers and of plastic fibers and, in particular, polypropylene (PP) fibers. The natural fibers can be formed from flax or kenaf, sisal, linen or cotton. In this case, said fibers are shaped to form a mat in a preparatory step or a step preceding the method. Subsequently, an interconnected plastic mat material is formed as a first or second layer with fusion of the plastic components under application of pressure and temperature.

The invention is described below with reference to an embodiment of the apparatus and with reference to a production method for production of a component and with reference to a production method from a first and a second layer, in which the first layer is a decoration layer and the second layer is a support layer.

The apparatus according to the invention for production of a component from at least one first layer 1, a decoration layer in the embodiment described, and one second layer 2, a support layer in the embodiment described, has a molding tool 10 which determines the contour of the component to be produced and has at least one first tool part 11, which faces the first layer and has a three-dimensional molding contour 13, and one second tool part 12, which faces the second layer and has a three-dimensional molding contour 14. The tool parts 11, 12 are moved toward each other by a pressure transducer (not illustrated) in order to bring about the molding of the first layer 1, or the decoration layer, and of the second layer 2, or the support layer, and the connection of the two layers 1, 2 to each other by moving the first and the second tool parts 11 and 12 together. The first tool part 11 can be fitted to a first tool holder or an installation plate 15 and a second tool part 12 can be fitted to a second tool holder or an installation plate 16.

The apparatus according to the invention furthermore has a clamping frame device 20 with clamping frame elements which are movable with respect to one another and in relation to the tool parts 11, 12, in order to hold the layers 1, 2 in a predetermined manner outside the contour region of the tool during the molding operation. Said clamping frame device comprises a first clamping frame element 21 which is movable relative to the first tool part 11 by means of a first adjusting device 31, a second clamping frame element 22 which is movable relative to the second tool part 12 by means of a second adjusting device 32, and a third clamping frame element 23 which is movable relative to the first tool part 11 by means of a third adjusting device 33. The third clamping frame element 23 is arranged between the first and the second clamping frame elements 21 and 22 and is movable therebetween. The clamping frame elements 21, 22 and 23 are guided in their direction of movement via the adjusting devices 31, 32, 33 and/or via separate guides.

The first, second and third adjusting devices 31, 32 and 33 are devices which are activated by a control device for automatic control, or, if appropriate, additionally via an actuating device for manual or semi-automatic control, of the production process in order to move the respective clamping frame elements 21, 22, 23. The first and the third adjusting devices 31 and 33 are preferably coupled mechanically to the first tool part 11 by, for example, said adjusting devices 31 and 33 and also the first tool part 11 being arranged on a first tool holder or a first installation plate 15. However, the first and the third adjusting devices 31 and 33 can also be fitted on another support or two different supports (not shown) such that, in this case, their extension position is independent of the position of the first tool part 11. The second adjusting device 32 is preferably coupled mechanically to the second tool part 12, for example by being fitted on a second tool holder or a second installation plate 16. However, the second adjusting device 32 can also be arranged on a support (not shown) which is independent of the position of the second tool part 12 such that, in this case, its extension position is independent of the position of the second tool part 12.

The third clamping frame element 33 is arranged, as seen in the relative direction of displacement of the tool parts 11, 12, between the first and the second clamping frame elements 31 and 32 in such a manner that the first and second layers can be placed, at least in some sections, between the mutually facing contours of the respective clamping frame elements, which contours are provided for the bearing of the first and second layers. It is preferably provided that, in the production process, the third clamping frame element 33 is moved between the positions of the first and the second clamping frame elements.

The clamping frame elements are each arranged outside the contour-shaping regions of the tool parts 11, 12. Said clamping frame elements can be formed as a single piece and designed as a structure which encircles the tool parts 11, 12. The clamping frame elements can also be formed in a number of parts along the circumference or along a region of the circumference of the tool parts 11, 12. A clamping frame element can also be formed from two parts which are arranged at locations outside the tool parts 11, 12. These locations can be situated in particular diametrically opposite each other. It is also possible for a plurality of parts, for example three or four parts, of a clamping frame element to be arranged outside the circumference of the particular tool part 11 or 12 or of the tool parts 11, 12 in a regular or irregular distribution about the latter, depending in each case on the application.

The clamping frame elements can be formed differently. The construction and arrangement of the clamping frame elements depends on the type, material and design of the component to be produced and on the type, material and design of the materials.

The clamping frame elements 31, 32, 33 each have a bearing region or two bearing regions which is or are provided during the production of the component for the purpose of an excess length region of the first and/or second layer being able to be placed against it and/or them. The first clamping frame element 21 and the second clamping frame element 22 each have a bearing region while the third clamping frame element 23 has two bearing regions. The bearing region 21a of the first clamping frame element 21 faces a first bearing region 23a of the third clamping frame element 23. These bearing regions 21a and 23a are each designed in such a manner that a holding of an excess length region of the layers 1 and 2, provided for holding purposes, can be achieved after the clamping frame elements 21 and 23 are correspondingly moved together. The holding can comprise clamping or retention, in particular with the possibility of the layers 1, 2 continuing to flow, or a combination of these functions. The same applies to a further or second bearing region 23b provided on the third clamping frame element 23 and to a bearing region 22a, which faces said bearing region 23b, of the second clamping frame element 22: these bearing regions 23b and 22a are each designed in such a manner that a holding of an excess length region of the layers 2 and 1, respectively, provided for holding purposes, can be achieved after the clamping frame elements 23 and 22 have been correspondingly moved together.

According to the invention, the third clamping frame element 23 is provided in order to keep the excess length regions, which are located outside the molding contours 13, 14 of the tool parts 11 and 12, of the two layers 1, 2, which are retained by the respective clamping frame elements, separate from each other during the closing movement of the tool parts 11, 12 and the molding of the layers 1, 2 by these tool parts 11, 12. This in particular avoids the layers 1, 2 sticking outside the molding contours 13, 14. In this manner, continued flowing of the layers, in particular even to a differing extent from each other, is made possible. In addition, machining of the layers and, in particular, trimming of the outer regions of the layers can take place subsequently independently of each other. Depending on the application, it can be provided, in particular by means of a special coating, that a bearing region or a plurality of bearing regions inhibits or inhibit the continued flowing of one or both of the layers 1, 2.

The mutually facing bearing regions 21a, 23a and 23b, 22a do not absolutely have to run parallel to each other. The bearing regions 21a, 23a and 23b, 22a can be coated in some regions or over the entire surface or can be provided with corresponding inserts in order, depending on requirements, to facilitate or make it more difficult for the layer 1 or 2 retained in each case between two clamping frame elements to continue flowing. In order to facilitate a continued flowing of a layer 1 or 2, the respective bearing regions or segments arranged thereon can contain, for example, polytetrafluoro ethylene (PTFE) constituents or can have a relatively low surface roughness. For this purpose, the respective bearing regions or segments arranged thereon can also have a metallic coating which, for example, is applied by electro-plating. In order to make it more difficult for a layer 1 or 2 to continue flowing, the respective bearing regions can contain friction-increasing constituents or segments. For this purpose, a suitable surface structure can also be provided.

The respective bearing regions 21a, 23a or 23b, 22a, which are provided for holding a layer 1 or 2, or segments arranged on said bearing regions and/or the tool parts 11 or 12 can be designed in a manner such that their temperature can be controlled entirely or in some regions by means of a temperature control device. In this case, all of the bearing regions 21a, 23a and 23b, 22a or an individual bearing region or only two mutually facing bearing regions or else just one tool part 11 or 12 can be temperature controlled entirely or in some regions. The temperature control device which can be arranged for this purpose is designed in such a manner that it can be used to set or regulate a temperature of the bearing region or of the segment constantly or as a function of time or process. The setting can be realized by means of a control, also with the aid of temperature sensors, in the bearing region or segment to be temperature-controlled in each case. The alternative regulation takes place on the basis of the temperatures, which are detected by means of temperature sensors, on the bearing region or segment to be temperature-controlled in each case.

By controlling the temperature of at least one bearing region or segment, the play of guides or fits or the spacing of movable parts can be optimized and, in particular, can be reduced, since the expansions of movable parts caused by the temperature changes can be set within predefined limits. The accuracy of the tools, the operational reliability and reliability of the production apparatus can thereby be improved.

A further advantage which can be achieved by controlling the temperature of at least regions of the bearing surfaces or segments or of at least one clamping frame element of the clamping frame device 20 or of one or more of the molding tools 10 is that the formation of condensed water on a super-cooled tool or clamping frame surface can be prevented. This also prevents the layers from being cooled, said cooling making it more difficult and even preventing the layers from being able to be molded and connected to each other.

The temperature control mentioned makes it possible to prevent regions of the bearing surfaces or segments from overheating. Overheating of this type would, in particular, negatively influence the surface structure of the component to be produced, as a result of which, in particular, a possibly desirable bowing effect, such as, for example, anti-dazzle effect, could be prevented. Therefore, it is advantageous, during the temperature control in particular also by means of a cooling mechanism, to provide a predefined process temperature.

The controlling of the temperature of one or both of the tool parts 11, 12, which control can be provided in addition or as an alternative to the controlling of the temperature of clamping frame elements, can be temperature-controlled by means of the abovementioned temperature control device or by means of a further temperature control device. In this case, a respective region on the molding contour 13 or 14 is temperature-controlled in order to bring or obtain the material used for the particular layer 1 or 2 to an advantageously processible state. A further advantage is that, by controlling the temperature of parts of the production apparatus, optimized configuration or operation of the same can take place.

The tool parts 11, 12 are movable with respect to each other between two positions by means of a tool advancing device (not illustrated). Each clamping frame element 21, 22, 23 is also movable independently by means of a respectively correspondingly assigned adjusting device 31, 32 and 33. Mechanical connection to the tools 11, 12 enables the frequency of the required actuations of the adjusting devices to be reduced. In this case, each clamping frame element 21, 22, 23 has at least one movement region which is required for use of the production apparatus for production of a component. The third clamping frame element 23 is movable between the extended positions of the first and of the second clamping frame element 21, 22 (FIG. 1). The positions between which the clamping frame elements are movable, and the positions between which the tool parts are movable at the same time, are provided in such a manner that the first and the second layers 1, 2 can be inserted and also molded and pressed on while, at the same time, those excess length regions or edge regions of the layers 1, 2 which are placed outside the molding contours 13, 14 are secured in such a manner that, over the course of the tool parts 11, 12 being moved together, continued flowing of one or both of the layers is temporarily possible.

The advancing device of the third clamping frame element 23 can be coupled to the first tool part 11, for example via the first tool holder 15, or, alternatively, can be coupled to the second tool part 12, for example via the second tool holder 16.

The extension positions of the advancing devices for the tool parts or the clamping frame elements can be coupled to one another or can be independent of one another. In the illustrated embodiment of the production apparatus, the first tool part 11 together with an end of the first advancing device 31 and of the third advancing device 33 is arranged on the first tool holder 15, and the second tool part 12 together with an end of the second advancing device 32 is arranged on the second tool holder 16. Alternatively, the third clamping frame element 23 can also be arranged on the second tool holder 16. Alternatively, partial or complete independence of the extension positions can be realized, for example by the adjusting device for the tool and the adjusting device for a clamping frame element assigned to said tool being arranged or fitted independently of each other mechanically.

The adjusting device positions required in the production method can be achieved by means of sensors and a comparison of the particular desired and actual position in a corresponding control device. In this case, it can be provided that the sensors detect the position of a corresponding actuating element in the respective advancing device or the position of the respective clamping frame element or tool part itself.

In the embodiment of the production apparatus according to FIG. 1 et seq., the retraction and extension positions of the clamping frame elements, which positions are provided for the method according to the invention, are achieved
via mechanical limiting elements together with the mechanical coupling of the extension positions of the clamping frame advancing devices to the position of the respectively assigned tool part,
by preferably mechanically defined maximum retraction and extension positions of the three clamping frame elements together with an additional limiting element for an intermediate position of the third clamping frame element, and
configuration of the third advancing device in comparison to the first and second advancing devices in respect of the adjusting force exerted in each case by the latter.

In this embodiment, each adjusting device needs to be moved to and fro only in a predefined sequence between two opposite end positions, in a manner controlled via an assigned control device, in order to fulfill the correct function for the production method according to the invention. The saving of sensors and a control based on a desired-actual comparison for the respective extension position of each adjusting device makes this embodiment of the production apparatus cost-effective.

In the embodiment illustrated, two spacers 41, 42 and two length-changeable distancing elements 45, 46 are provided for this. The spacers 41, 42 are provided in order to be able to move respectively adjacent clamping frame elements 21, 23 or 23, 22 relative to each other at a defined distance and in order to be able to delimit them at a minimum distance from each other at least for a certain time. For this purpose, on corresponding clamping frame elements 21, 22, 23 there can be arranged rigid spacers or spacers which are height- or length-changeable in the direction of the movements or corresponding relative movements of the clamping frame elements. When spacers which are fixed with respect to the movements of the clamping frame elements, i.e. are not height-changeable, are used, by moving the respective clamping frame elements together, a constant minimum distance is achieved between them during the production process. When height-changeable spacers are used, those positions of the clamping frame elements which are defined by the stop elements are approached by the corresponding movement of said clamping frame elements. During the further course of the process, the spacers are changed in their height in a predefined manner such that the distance of the clamping frame elements relative to each other is also changed. This can be changed on the basis of the closing movement of the tool parts and/or coupled to the extension position of the respective adjusting device. By changing the distance, the continuing-flowing and clamping behavior of the clamping frame elements with regard to the layers 1, 2 respectively held is changed. The effect achieved by this is that, in each position of the tool parts, a continued flowing of the layers 1 and 2 held by the respective clamping frame elements is ensured, if this is required by the molding contour provided by the tool parts 11, 12, in order to produce the component in the designated form, thickness and strength in a crease-free manner.

FIG. 1 illustrates a spacer 41 and a spacer 42. The spacer 41 is fitted on that side of the first clamping frame element 21 which faces the third clamping frame element 23 and defines the minimum distance between the first and the third clamping frame elements. The spacer 42 is fitted on that side of the second clamping frame element 22 which faces the third clamping frame element 23 and defines the minimum distance between the second and the third clamping frame elements. Similarly, the spacer 41 could be arranged on that side of the third clamping frame element which faces the first clamping frame element 21. Analogously, the spacer 42 could be arranged on that side of the third clamping frame element 23 which faces the second clamping frame element 22.

When the spacers are configured as height-changeable spacers, they can be extended via an actuating drive, which is functionally connected to the control device, in order to bring about the spacing, which is required in phases, of the respectively interacting clamping frame elements by means of a corresponding extension position of the particular spacer at a particular moment. In addition to such an electronically controlled adjustment of the spacers, the latter can alternatively also be controlled hydraulically or via a radial cam. Such a radial cam for the clamping frame elements preferably takes the respective positions of the tool parts into consideration.

In order to adjust or limit the respectively permitted positions in the movement of the third clamping frame element 23 relative to the two other clamping frame elements and to the tool parts 11, 12, in the embodiment of the production apparatus according to the invention as per FIG. 1 et seq., a first distancing element 45 coupled to the first tool part 11 via the tool holder 15 and a second distancing element 46 coupled to the second tool part 12 via the tool holder 16 are provided.

The two distancing elements 45, 46 can be adjusted or can be extended via the control device or their lengths can be changed in a predefined manner during the course of the production method.

In order to adjust the height or length of the adjusting devices 31, 32, 33 or of the distancing elements 45, 46, said devices or elements can be designed in different ways, and in particular in the form of a cylinder-piston drive, and can be activated by the control device.

In the production apparatus as per FIG. 1 et seq., the interaction of the tool parts and clamping frame elements in conjunction with the spacers and distancing elements is as follows: when the tool parts 11, 12 are extended or in an open position with respect to each other, the first clamping frame element 21 and the second clamping frame element 22 and the advancing devices 31, 32 thereof can also be retracted. In this state, the clamping frame elements 21, 22 are extended relatively far apart in an initial position or first position (FIG. 1), and the third clamping frame element 23 is movable between the first clamping frame element 21 and the second clamping frame element 22. The extended position of the third clamping frame element 23 (FIG. 1) permits the first layer 1 to be placed between the first clamping frame element 21 and the third clamping frame element 23, and the second layer 2 to be placed between the second clamping frame element 22 and the third clamping frame element 23. The first layer 1 is preferably placed first between the first clamping frame element 21 and the third clamping frame element 23, with the first clamping frame element 21 and the third clamping frame element 23 still being in an extended position with respect to each other (FIG. 2). In this extended position of the tool parts 11, 12, the movability of the third clamping frame element is limited in a first limiting position by the first distancing element 45. This first limiting position of the third clamping frame element 23 is part of a second position of the clamping frame elements, in which position the mutually facing contour surfaces of the first clamping frame element 21 and of the third clamping frame element 23 take up a predetermined distance from each other in which the first layer 1 can be held between the first and the third clamping frame elements 21, 23 and, depending on the application, continued flowing or securing of the first layer is brought about, in particular owing to a movement of one or both of the tool parts 11, 12, during holding and movement of the first layer. In the embodiment of the apparatus of FIGS. 1 to 7, in the first position of the clamping frame elements, the first clamping frame element 21 is supported against the third clamping frame element 23 via the first spacer 41 in order to take up a predefined distance from the third clamping frame element 23 (FIG. 3). The height, which is defined in this situation by the first spacer 41, between the bearing regions of the first and third clamping frame elements is provided in such a manner that the first layer 1 is held in the manner according to the invention. In this case, it can be provided that the first adjusting device 31 is over-compressed for a short distance, i.e. is further retracted, by the movement of the third adjusting device 33 in a corresponding direction owing to the interaction of the first and third clamping frame elements via the first spacer 41.

The second layer 2 is preferably placed in the first limiting position between the second clamping frame element 22 and third clamping frame element 23 and between the tool parts 11, 12 (FIG. 4). However, the second layer 2 can also already be placed in the open position of the tool parts 11, 12 (FIG. 2). In this state of the first and third clamping frame elements 21 and 23 (first limiting position of the third clamping frame element), the tool parts 11, 12 are movable from an open position into a first tool intermediate position (FIG. 5). In the case of this first intermediate position, in a third position of the clamping frame elements, the mutually facing bearing regions of the first and third clamping frame elements in accordance with the first position according to FIG. 3 and the mutually facing bearing regions of the second and third clamping frame elements take up a predetermined distance such that the first layer 1 and the second layer 2 are held in the manner according to the invention. Depending on the application, this holding state can permit continued flowing movements of the first and/or second layer to be inhibited or allowed. In the embodiment of the production apparatus according to FIGS. 1 to 7, the third clamping frame element 23 is furthermore supported against the first clamping frame element 21 via the first spacer 41, and the second clamping frame element 22 is supported with respect to the third clamping frame element 23 via the second spacer 42. The height, which is defined in this situation by the second spacer 42, between the bearing regions of the second and third clamping frame elements is provided in such a manner that the second layer 2 is held in the manner according to the invention. In this case, the second clamping frame element 22 is extended in the direction of the first clamping frame element 21. In this extended position, the second clamping frame element 22 is preferably placed in such a manner that its contour point which is placed closest in the direction of the first clamping frame element 21 is placed, with respect to the direction of movement of the tool parts 11, 12, in the region between the uppermost and lowermost contour points of the second tool part 12, and, depending on the application, furthermore is also placed in the direction of the first clamping frame element 21. In this case, preferably, both that contour point of the first clamping frame element 21 which is placed closest in the direction of the first tool part 11 and that contour point of the second clamping frame element 22 which is placed closest in the direction of the second tool part 12 are placed between that contour point of the first tool part 11 which is placed closest to the first clamping frame element 21 and that contour point of the second clamping frame element 22 which is placed closest to the second clamping frame element 21.

In this first tool intermediate position, this movability of the second adjusting device 32 has to be ensured until the second clamping frame element 22 is movable into a position in which the bearing region 22a of the second clamping frame element 22 merges within predefined limits onto the level of the molding contour 14 in that edge region of the second tool part 12 which faces the second clamping frame element 22. In this state, a possibly intentional continued flowing of the second layer 2 can take place during further closing of the tool parts 11, 12 until the final closed position is reached.

In the realization of the production apparatus according to FIGS. 1 to 7, the resultant region of movement of the third clamping frame element 23 and of the second clamping frame element 22 is limited by the second distancing element 46, since the third clamping frame element 23 together with the first clamping frame element 21 can be moved, with the closing movement of the tool parts 11, 12, in the direction of the second tool part 12 until the latter rests on the distancing element 46 as the limiting element for the movement of the third clamping frame element 23.

Figure 6:
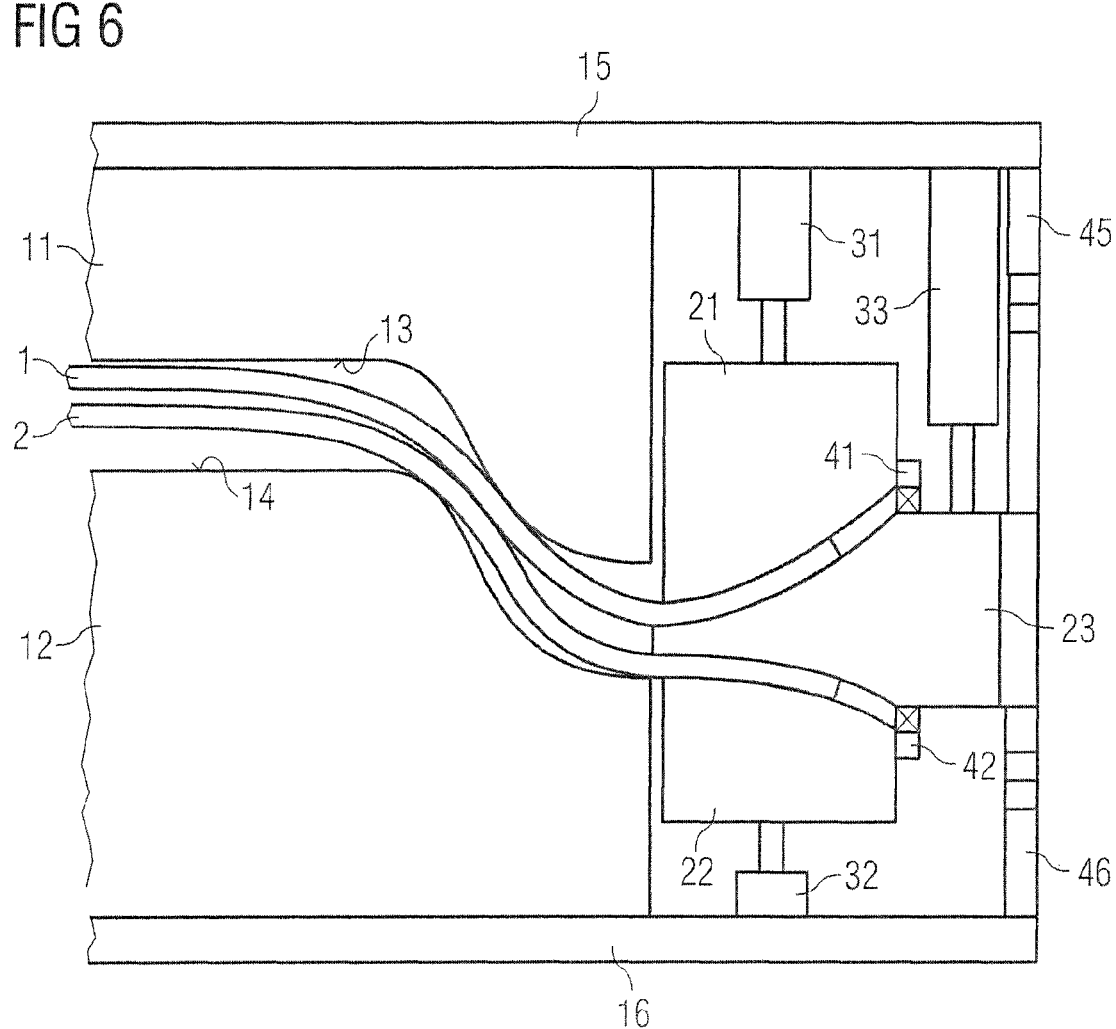
FIG. 6 shows the embodiment of the production apparatus according to the invention as per FIG. 1 with a second tool intermediate position and a fourth position of the clamping frame elements.
Figure 7:
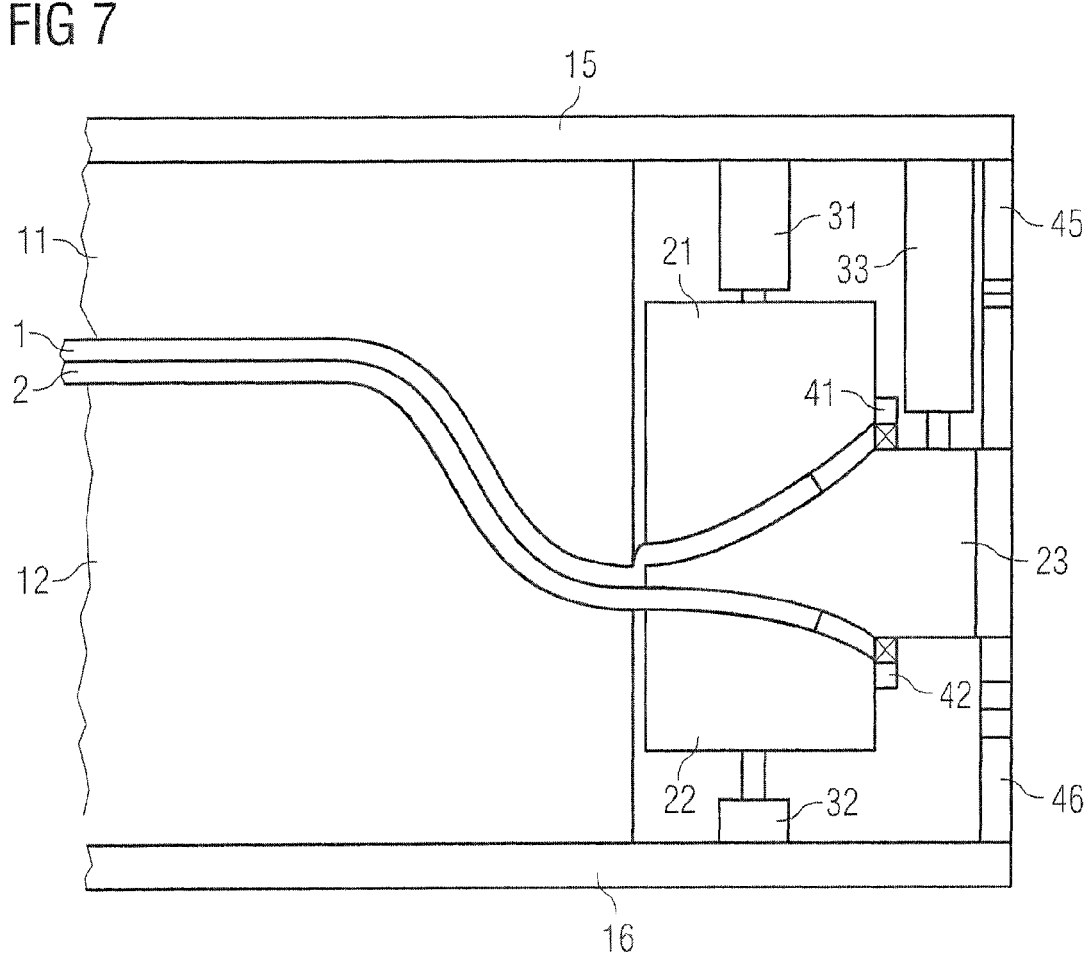
FIG. 7 shows the embodiment of the production apparatus according to the invention as per FIG. 1 with a tool-closing position and a fifth position of the clamping frame elements.

Starting from this first tool intermediate position, the tool parts 11, 12 are movable via a second tool intermediate position (FIG. 6) into a closed position or pressing position or laminating position (FIG. 7).

In this second tool intermediate position, the tool parts 11, 12 are moved further toward each other in comparison to the first tool intermediate position. In this case, the clamping frame elements are arranged in a fourth position with respect to one another. In this fourth position, as in the third position according to FIG. 5, the mutually facing bearing regions of the first and third clamping frame elements and the mutually facing bearing regions of the second and third clamping frame elements take up a predetermined distance such that the first layer 1 and the second layer 2 are held in the manner according to the invention. However, the arrangement of the first, second and third clamping frame elements 21, 22, 23 is additionally moved in the direction of the second tool part 12 in such a manner that that contour point of the first clamping frame element 21 which is placed closest in the direction of the first tool part 11 and that contour point of the second clamping frame element 22 which is placed closest in the direction of the second tool part 12 are placed between that contour point of the first tool part 11 which is placed closest to the first clamping frame element 21 and that contour point of the second clamping frame element 22 which is placed closest to the second clamping frame element 21, and that, preferably, furthermore that contour point of the second clamping frame element 22 which is placed closest in the direction of the second tool part 12 is placed within a deviation level with that contour point of the second clamping frame element 22 which is placed closest to the second clamping frame element 22, with said deviation being equal to twice the thickness of the second layer 2.

In the apparatus and the method according to FIGS. 1 to 7 the first and the third clamping frame elements and the second and the third clamping frame elements are separated from each other by the respective spacers 41 and 42, and the third clamping frame element is retained in a predefined manner between the distancing elements 45, 46, with the first and the second distancing elements 45 and 46 being in an extended position such that the three clamping frame elements 21, 22, 23 are separated from one another by the spacers 41, 42 and, together with the first and second layers 1 and 2 placed between them, are in a position in which that contour point of the second clamping frame element 22 which is placed closest in the direction of the second tool part 12 is placed within the abovementioned deviation level with that contour point of the second clamping frame element 22 which is placed closest to the second clamping frame element 21.

According to the invention, furthermore, the tool parts 11, 12 are further moved together into their closed position by the adjusting device of the tool parts 11, 12, and the arrangement with the first, the second and the third clamping frame elements 21, 22, 23 is moved into a fifth position in which in addition to the determining elements of the fourth position of the clamping frame elements that contour point of the first clamping frame element 21 which is placed closest in the direction of the first tool part 11 is placed within a deviation level with that contour point of the first clamping frame element 21 which is placed closest to the first clamping frame element 21, with said deviation preferably being equal to three times the thickness of the first layer 1.

The closed position of the tool parts 11, 12 is a position in which the first layer 1 and the second layer 2 can be connected to each other, and in which, if appropriate, the pressure required for such connection can be built up.

In the fifth position of the arrangement of the three clamping frame elements 21, 22, 23, in the embodiment illustrated in the figures, the first adjusting device 31, the third adjusting device 33 and the first distancing element 45 are over-compressed. This means that, in the case of this mechanical realization of the production apparatus, the second adjusting device 22 together with the second distancing element 46 are capable of over-compressing the first and third adjusting devices together with the first distancing element 45.

In summary, the embodiment, illustrated in FIGS. 1 to 7, of the production apparatus is designed as follows: the first and third adjusting devices 31 and 33 and the first distancing element 45 are connected mechanically to the first tool part 11 optionally via intermediate elements, such as, for example, the first tool holder 15, or are coupled to the movement of said tool part. Similarly, in the embodiment illustrated, the second adjusting device 32 and the second distancing element 46 are connected mechanically to the second tool part 12 optionally via intermediate elements, such as, for example, via the second tool holder 16, or are coupled to the movement of said tool part. In this case, the first and the second distancing elements 45 and 46 each act on the third clamping frame element 23 and have the function of ensuring the movement of the third clamping frame element 23 or of the third adjusting device 33 into defined intermediate positions. These intermediate positions can take place via a locking function carried out mechanically, by the extension position of the distancing elements being blocked, or via a displacement-controlled mechanism. The first and the second adjusting devices 31 and 32 have a spring function with a preferably variable force, since the displacement distances of the adjusting devices are dependent on the pressure which is exerted by the third adjusting device 33. In addition, forces can be exerted on the first and/or second clamping frame element by the distancing elements 45, 46 directly or via the third clamping frame element.

Instead of the production apparatus described, the latter can also be partially or entirely operated via electronically activated or monitored adjusting devices, in which the intermediate positions of the third clamping frame element can be achieved via sensors or incremental transducers and a corresponding control device.

In the case of the realization with the electronic activation, starting from the second tool intermediate position and with further moving of the tool parts 11, 12 together into their closed position, the first adjusting device 31, the third adjusting device 33 and the first distancing element 45 are not over-compressed by the arrangement of the three clamping frame elements 21, 22, 23. On the contrary, in order to reach the abovementioned positions of the tool parts and of the clamping frame elements, the first adjusting device 31, the third adjusting device 33 and the first distancing element 45, activated via the electronic control, are retracted or moved back to the same degree as the second clamping frame element 22 and the third clamping frame element 23 are extended or moved in the same direction.

In the case of the realization with the electronic activation, furthermore the spacers 41, 42 can be omitted, since the spacing of the first clamping frame element from the third clamping frame element and the spacing of the second clamping frame element from the third clamping frame element can be achieved by a controlled displacement-monitored adjusting movement of the three clamping frame elements. In this case, the adjustment of the distances between the clamping frame elements can likewise be adjusted or regulated in an electronically controlled manner.

The third clamping frame element can be formed in such a manner that it can hold one layer or a plurality of layers such that, then, the production apparatus can be used, according to the invention, to process three layers or more than three layers together. In this case, a plurality of third clamping frame elements can also each be provided with a dedicated third adjusting device.

According to the invention, it is ensured, in particular, that a free continued flowing of the layers, which continued flowing is to be provided depending on the application, is possible during the transitions into the various positions of the production apparatus:

By spacing apart the first clamping frame element from the third clamping frame element and spacing apart the second clamping frame element from the third clamping frame element by means of preferably adjustable spacers 41, 42 and alternatively or additionally by means of a controlled and optionally travel-monitored adjusting movement of the three clamping frame elements, which movement takes place by means of the electronic travel control of the adjusting devices 31, 32, 33 and clamping frame elements 21, 22, 23, it is achieved that the first and/or the second layer 1 and/or 2 can continue to flow to a greater or lesser extent, depending on the requirement of the application, during the closure of the molding tool. In this case, the distance set can also be provided in such a manner that the layers 1, 2 can be clamped, i.e. can be held by the respective clamping frame elements.

Depending on the application, the respective setting can realize these extreme states or can realize states between these extreme states.

The arrangement of the third clamping frame element 23, which arrangement is preferably provided in the end phase of the moving together of the tool parts 11, 12, from a certain position of the same with respect to each other, has the effect, in a distance, which is dependent on the application, relative to the first and/or second clamping frame element that the layers 1, 2 are retained by the respective clamping frame elements 21, 23 and 22, 23 or the clamping frame elements permit a defined continued flowing of the layers 1, 2. The effect achieved by ensuring a continued flowing of one or more of the layers is that, in particular when tool parts having molding contours running three-dimensionally are used, a crease in the region of the subsequent component contour is avoided. In this case, the selection of the retaining force for the first layer 1 or the generosity with the effect of permitting continued flowing of this layer 1 can differ from the selection of the retaining force exerted on the second material layer 2 or permitted generosity.

The function of the first adjusting device 31, the second adjusting device 32 and the third adjusting device 33 is to move the clamping frame elements 21, 22 and 23 into predetermined positions relative to one another and relative to the tool parts 11, 12 assigned to them. In the embodiment, illustrated in the figures, of the production device, the first adjusting device 31 and the second adjusting device 32 do not execute an adjusting movement actively, i.e. by their own drive, but rather have a spring function exerted by the third clamping frame element 23 on account of the pressing-on operation. In the embodiment illustrated, the active adjusting function is taken on by the tool adjusting devices, since the tool parts 11, 12 are coupled mechanically to the first adjusting device 31 and the second adjusting device 32 via the installation plate or the tool holder. To be precise, the third adjusting device 33 is also coupled to one of the tool parts 11, 12 via the installation plate or the tool holder. However, the third adjusting device 33 has the function of moving the third clamping frame element 23 relative to the first and the second clamping frame elements 21 and 22 and relative to the first tool part 11 and the second tool part 12, and therefore its active adjusting function cannot be taken on by another adjusting function of the production apparatus.

Nevertheless—also in the embodiment, illustrated in FIGS. 1 to 8, of the production apparatus—the first adjusting device 21 and the second adjusting device 22 are provided as independent adjusting devices mounted on the particular installation plate in order to be able to load the clamping frame elements with the layers or semi-finished products of the layers at the beginning of the process. However, this can be omitted in the case of the second adjusting device if the first and third adjusting devices permit a movability in which the first and the third clamping frame elements provide a corresponding amount of clearance in their retracted or initial state in order to load or place the layers into the production apparatus.

In order to actuate the optionally provided cutting apparatus described below, it is possible, depending on the embodiment of the same, for the first and/or second adjusting device also to be designed to be actively movable or controllable in relation to the first and/or second tool part or the associated tool holders thereof. As a result, it is possible to execute the cutting force, which is carried out by the optionally provided cutting apparatus, or to apply a required, assisting or load-alleviating force for the cutting operation.

The independent active movability of the first and/or second adjusting device also in relation to the first tool part 11 and/or second tool part 12 or the associated tool holders thereof together with the active movability, which is provided in any case, of the third clamping frame element 23 is also advantageous with regard to removal of the component produced or of any residues which have arisen or cut-off residues or excess lengths of the layers.

In general, it is also possible to omit bringing about the first and/or the second position of the clamping frame elements, and to approach the third position of the clamping frame elements directly.

Figure 8:
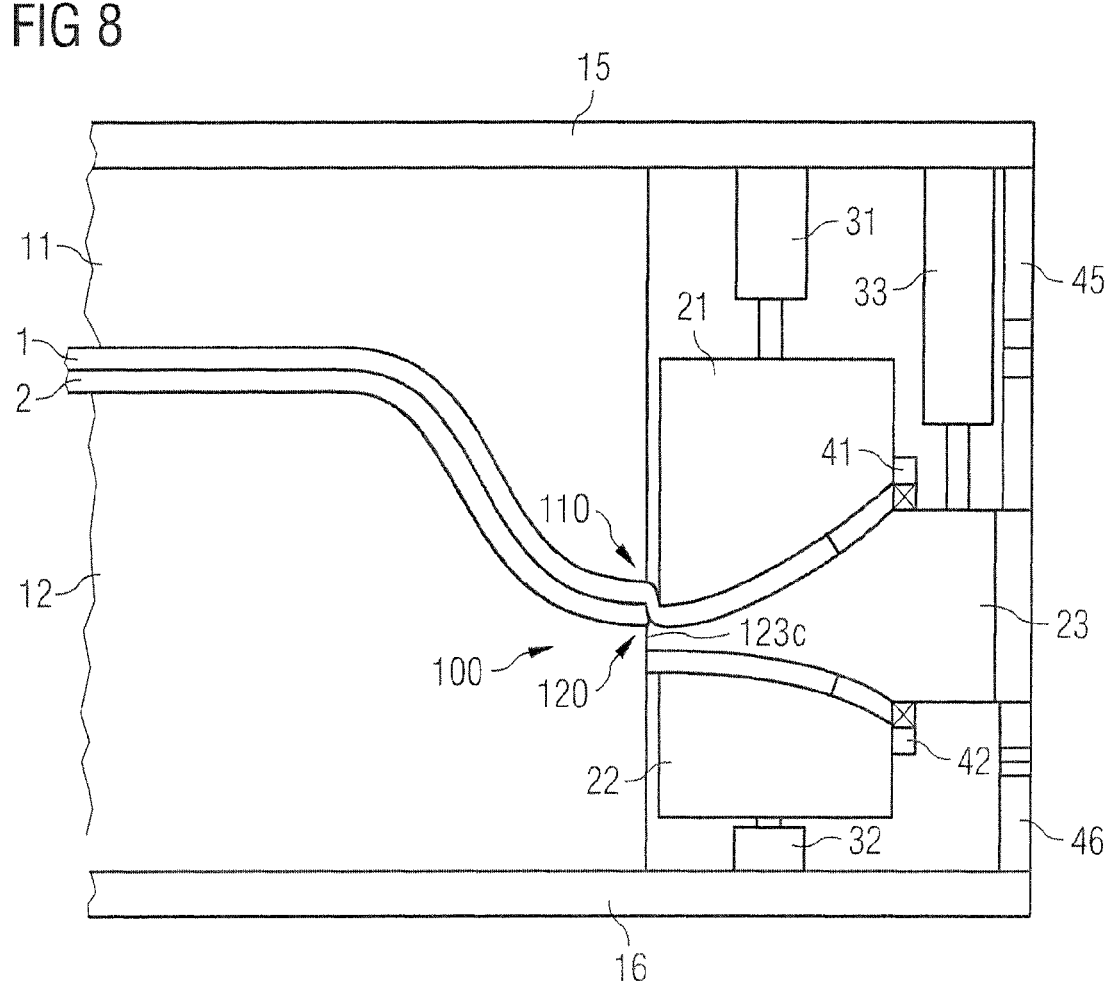
FIG. 8 shows the embodiment of the production apparatus according to the invention as per FIG. 1 with a sixth position of the clamping frame elements.

The production apparatus according to the invention can optionally have one or more cutting apparatuses, which, if appropriate, can be activated in the closed position of the tool parts 11, 12, in order to cut or trim one or more of the layers 1, 2. In this case, cutting can be provided in sections of the circumference of the molding contours or over the entire circumference. An excess length of the first and/or of the second layer can also be cut off by means of the cutting apparatus. A bending excess length for one or both layers can also be formed by the cutting operation if, by cutting or shortening one layer 1, 2 in comparison to another layer 2 or 1, the respectively other layer 2 or 1 protrudes over the layer cut further. The resultant excess length can be processed in a further method step to form a bend, for example about the shorter layer. In the case of the apparatus according to the invention, an individual layer can be trimmed, since the layers are kept separate from each other outside the molding contours 13, 14 by the third clamping frame device 23. The cutting device can be arranged on the first clamping frame element and/or the third clamping frame element for cutting off an excess length of the one layer or of a plurality of layers, which excess length emerges between the first and the second tool parts. The optionally provided cutting device can be realized in different ways:

First of all, a first cutting device 100 is described below, which can be actuated in the direction of the adjusting movement of the third clamping frame element 23 in order to hold the first or second layer 1, 2. The first cutting device 100 is part of the third clamping frame element 23 and of at least one tool part 11, 12, with the cutting operation taking place by means of movement into predefined apparatus positions. FIG. 8 shows the production apparatus with a sixth position of the clamping frame elements, in which the third clamping frame element has executed the cutting movement.

For this purpose, the third clamping frame element has a front edge 123c which acts as a cutting edge. Furthermore, that contour point of the first and/or second tool part 11, 12 which is placed closest to the third clamping frame element 23 is designed as a counterposition to the cutting edge 123c and, optionally, additionally as a cutting edge. The counterposition is formed on the first tool part 11 if the first layer 1 is to be cut by means of the cutting apparatus 100 or the cutting edge 123c. Alternatively or in addition, the counterposition is formed on the second tool part 11 if the second layer 2 is to be cut by means of the cutting apparatus 100 or the cutting edge 123c.

The front edge 123c of the third clamping frame element 23 is arranged in such a manner that, given a corresponding position of the third clamping frame element 23 with respect to the second tool part 12, it runs in some regions close to the outer contour of the tool part 12 and, at the same time, is spaced apart from the same at a distance suitable for the cutting operation.

The edge 23c on the third clamping frame element and/or the edge 12a on the second tool part 12 can be of hardened or hardened and tempered design.

The cutting process by means of the first cutting device 100 is as follows:

After the closed position of the molding tool is reached, in which the third clamping frame element initially continues to rest on the extended second distancing element 46, the third clamping frame element 23, which is driven by the third adjusting device 33, is lowered by the third adjusting device 33 into a lower position. In the embodiment of the production apparatus according to FIGS. 1 to 7, this takes place by retraction of the second distancing element 46. In this embodiment, the lower position of the second distancing element 46 is preferably provided in such a manner that the latter limits the movement of the third clamping frame element 23 downward after the cutting operation. The first adjusting device 31 can be actuated or can be actuable in such a manner that it assists the cutting force exerted by the third adjusting device 33. In the process, the second clamping frame element 22 is over-compressed and/or switched to a depressurized state prior to/with the cutting movement or retracted during the cutting movement.

According to the production apparatus according to FIGS. 1 to 7, the second distancing element 46 can be retracted in order to provide the third clamping frame element 23 with sufficient freedom of movement and, in particular, without a counterforce exerted by the second distancing element 46. As a result, a movement relative to the second tool part 12 can be carried out by the third clamping frame element 23. This movement is a cutting movement if a corresponding edge of the third clamping frame element 23 moves appropriately close along a bearing or contact region of the second tool part such that the second layer 2 can be correspondingly severed. In this case, the third clamping frame element 23 therefore acts as a die-plate and the second tool part as a punch, or both act in the manner of shears with respect to each other.

By means of the optionally provided control of the temperature of at least one bearing region or segment, the play or the spacing of the cutting surface with respect to the second tool part, i.e. the cutting fit, can be optimized and, in particular, reduced.

A second cutting device 200 is described below, which can be actuated transversely with respect to the direction of the adjusting movement of the third clamping frame element 23 for holding the first or second layer 1, 2. The second cutting device 200 is part of the third clamping frame element 23 or is assigned thereto. In both cases, said third clamping frame element is moved or actuated via an adjusting device 201. Said cutting device 200 preferably comprises at least one blade 230 which is movable via the adjusting device 201 in order to cut off an excess length of the second layer 2, which excess length emerges between the first and the second tool parts (FIG. 10). The blade is displaceable longitudinally by means of the actuating drive 201 and is arranged in or on the third clamping frame element 23 such that it is movable transversely with respect to the adjusting movement of the third clamping frame element 23 and/or of the second tool part 12. The blade 230 has a cutting edge 223 which faces the second tool part 12.

On the basis of the actuation of the actuating drive 201 of the blade 230, the latter is moved up to a corresponding edge region 221 of the second tool part 12, which edge region is provided as the countersurface for the cutting edge, which faces it, of the blade 230. By means of corresponding retraction of the second adjusting device 32, a part of the corresponding excess length of the second layer 2, which excess length is to be cut off, is placed between the cutting edge of the blade and the second tool part 12. The excess length of the second layer 2 is then cut off by the pressure applied on the basis of the advancing movement of the blade 230.

Alternatively, a corresponding edge region 222 of the second clamping frame element 22 can also be used as a counterposition such that, then, an excess length of the second layer 2 can be cut off by the cutting edge 223 of the blade 230 and the counterposition 222 of the second clamping frame element 22.

A third cutting device 300 is described below, which cutting device can be actuated in the direction of the adjusting movement of the third clamping frame element 23 for holding the first or second layer 1, 2, in order to trim the first layer 1 and optionally the second layer 2. The third cutting device 300 can be arranged as an alternative or in addition to the first or second cutting device 100 or 200.

The third cutting device 300 comprises a blade or cutting blade 330 which is movable by an advancing device 301 and is guided by a mechanism 340 with a guide. The mechanism is designed in such a manner that the blade 330 is arranged such that it can be displaced in the direction of the path of movement or the adjusting movement, for example, of the first adjusting device 31 in order to trim the first layer 1. In this case, a corresponding region of the bearing region 23a of the third clamping frame element 23, which bearing region faces the cutting edge 350 of the blade 330, serves as a counterposition 323c for the cutting edge 350 during cutting of the first layer 1.

FIG. 11 shows the state of the cutting apparatus after carrying out the cutting movement.

The first layer 1 can optionally also be cut together with the second layer 2 if the third clamping frame element 23 is pulled back beforehand with respect to the tool parts 11, 12 such that, then, a corresponding bearing region of the second clamping frame element 22 can serve as the counterposition.

The cutting blade 330 can be designed either as a thermal or mechanical blade. In the embodiment as a thermal blade, the latter is heatable, for example, via a resistor. The blade can also be designed both as a thermal and as a mechanical blade. The heating of the blade makes it possible to carry out a sealing function, in particular in the case of temperature-sensitive first layers 1.

The cutting edge 350 of the cutting blade 330 can be designed, in particular, as a contour-dependent cutting surface, i.e. as a three-dimensional cutting surface.

The three cutting apparatuses 100, 200, 300 described above can be provided individually or in combination in one and the same production apparatus.

An embodiment of the method is described below, in which the first layer is a decoration layer and the second layer is a support layer. In general, the layers can also have different use functions and/or can also each be formed in turn from a plurality of layers. According to the invention, the method is, in particular, a single-stage process for producing a support part including laminating it with a decoration layer.

The first and the third clamping frame elements 21 and 23 are movable in such a manner that the relative positions of the first and third clamping frame elements 21 and 23 can be adjusted between a first position or basic position and a second position. The basic position of the first and third clamping frame elements 21 and 23 is provided in such a manner that the first layer or, for example, the decoration layer can be placed between these clamping frame elements 21, 23. In this basic position, the second clamping frame element 22 can be positioned in such a manner that the second layer 2 can be placed between the second and the third clamping frame elements.

In the second position of the first and third clamping frame elements 21 and 23, the first layer is held in a predefined manner by these clamping frame elements 21, 23 while the two tool parts 11, 12 are being moved together, whereas the first and second tool parts 11 and 12 are in a position in which the first layer 1 and the second layer 2 are not subject to any molding by them. The third clamping frame element 23 and the second clamping frame element 22 are movable with respect to each other in such a manner that the second layer 2 or support layer can be fixed in a third position of the clamping frame elements by means of the second clamping frame element 22 and the third clamping frame element 23 such that the second layer and the first layer are held separately from each other outside the tool parts by means of the third clamping frame element. In this state of the fixed first layer, the first tool part 11 and the second tool part 12 can be moved together relative to each other in order to mold and to connect the second layer 2 and the first layer 1 to each other within the tool upon closing of the latter.

According to the invention, a method for production of a component from at least one first layer 1 or decoration layer and one second layer 2 or support layer is provided, in which molding of the first layer 1 and of the second layer 2 and connection of the two layers 1, 2 to each other takes place by moving together a first tool part 11 and a second tool part 12 of a molding tool with preferably three-dimensional molding contours, with the molding contour of the first tool part 11 facing the first layer 1 and the molding contour of the second tool part 12 facing the second layer 2, the first tool part 11 and the second tool part 12 having been moved apart in an initial position. The method according to the invention comprises the following steps:

moving a first clamping frame element 21 and a second clamping frame element 22 into an extended position with respect to each other and placing the first layer 1 in a placing-in position between the two tool parts 11, 12 and between the first clamping frame element 21 and a third clamping frame element 23, which is arranged between the first clamping frame element 21 and the second clamping frame element 22, with the first, second and the third clamping frame elements being arranged outside the molding contour of the tool parts 11, 12;

moving the third clamping frame element 23 into a retaining position for the first layer 1, in which position the third clamping frame element 23 is at a predefined distance from the first clamping frame element 21 and in which the first layer 1 is retained by the first clamping frame element 21 and the third clamping frame element 23 (FIG. 3), placing the second layer 2 between the two tool parts 11, 12 and onto the second clamping frame element 22 (FIG. 4), moving the second clamping frame element 22 into a retaining position for the second layer 2, in which position the second clamping frame element 22 at a predefined distance from the third clamping frame element 23, and in which the second layer 2 is retained by the second clamping frame element 22 and the third clamping frame element 23 (FIG. 5), moving together the tool parts to relative positions with respect to each other, during which the first layer 1 and the second layer 2 are molded, after the molding, moving apart the tool parts and the clamping frame elements in order to remove the interconnected first and second layers from the tool.

It may optionally additionally be provided that, after the molding operation, an excess length of the second layer, which excess length emerges between the first and the second tool part, is cut off by means of a cutting device.

Before the layers 1, 2 are placed between the tool parts, heating of the first or of the second layer can take place.

When the tool parts 11, 12 are moved together, the second and the third clamping frame elements can be moved into a relative position with respect to each other in which, depending on the application, the second layer can continue to flow in a predefined manner during the molding of the layers, or a continued flowing can be inhibited. Similarly, in step (e), the first and the third clamping frame elements can be moved into a relative position with respect to each other in which, depending on the application, the first layer can continue to flow in a predefined manner during the molding of the layers, or a continued flowing can be inhibited.

The invention claimed is:

1. A method for production of a component by press molding of a first and of a second material layer, during which the two layers are connected within the molding contours of two tool parts by moving the tool parts together, the first tool part and the second tool part having been moved apart in an initial position, said method comprising the following steps:

(a) moving a first clamping frame element and a second clamping frame element into an extended position with respect to each other and placing the first layer between the two tool parts and between the first and a third clamping frame element, which is arranged between the first and the second clamping frame elements, and placing the second layer between the two tool parts and between the second clamping frame element and the third clamping frame element, with the first, second and the third clamping frame elements being arranged outside the molding contour of the tool parts, (b) moving the first clamping frame element, second clamping frame element and the third clamping frame element together into a position in which the first layer is held by the first clamping frame element and the third clamping frame element and the second layer is held by the second clamping frame element and the third clamping frame element, such that the first layer and the second layer are able to flow relative to each other during the molding of the layers, (c) moving the tool parts together relative to each other with molding of the first and of the second layers in the region of the molding contours of the tool parts, (d) moving the tool parts and the clamping frame elements apart in order to be able to remove the interconnected first and second layers from the tool, and (e) setting the distance between the first clamping frame element and third clamping frame element and between the second clamping frame element and third clamping frame element by means of spacers when the first clamping frame element, second clamping frame element and third clamping frame element are moved together in step (b), said spacers being configured so that they do not contact a front surface or a back surface of either the first or the second layer during molding of the layers.

2. The method for production of a component from at least one first and one second layer as claimed in claim 1, wherein, when the first clamping frame element, second clamping frame element and third clamping frame element are moved together in step (b), the position of the third clamping frame element with respect to the first clamping frame element is determined by a first distance element which is coupled to the position of the second tool part.

3. The method for production of a component from at least one first and one second layer as claimed in claim 1, wherein, after the molding operation, an excess length of the second layer, which excess length emerges from between the first tool part and the second tool part, is cut off by means of a cutting device and/or an excess length of the first layer, which excess length emerges from between the first tool part and the second tool part, is cut off by means of a cutting device.

4. The method for production of a component from at least one first and one second layer as claimed in claim 1, wherein that heating of one or both of the layers takes place before they are placed between the tool parts and onto the second clamping frame element.

5. The method for production of a component from at least one first and one second layer as claimed in claim 1, wherein the first layer and/or the second layer is/are multi-layered.

6. A method for production of a component by press molding of a first and of a second material layer as claimed in claim 1, wherein the first layer is a decoration layer and the second layer is a support layer of the component to be produced, or the first layer is a support layer and the second layer is a decoration layer of the component to be produced.

7. The method for production of a component from at least one first and one second layer as claimed in claim 6, wherein at least that surface of the decoration layer which faces the support layer is formed from a woven cloth.

8. The method for production of a component from at least one first and one second layer as claimed in claim 6, wherein the surface of the decoration layer is formed from fleece, from felt, a flat cloth or from a circular knit.

9. The method for production of a component from at least one first and one second layer as claimed in claim 6, wherein the decoration layer is formed from a textile cloth, an expanded leather cloth, or a leather.

10. The method for production of a component from at least one first and one second layer as claimed in claim 6, wherein the decoration layer is formed from textile materials, a foam and a fleece material.

11. The method for production of a component from at least one first and one second layer as claimed in claim 6, wherein the support layer is formed from natural fibers, glass fibers, plastic fibers and/or polypropylene (PP) fibers.

12. The method for production of a component from at least one first and one second layer as claimed in claim 11, wherein the support layer comprises natural fibers selected from flax or kenaf, sisal, linen or cotton.

13. The method for production of a component from at least one first and one second layer as claimed in claim 6, wherein at least that surface of the decoration layer which faces the support layer is formed from a woven cloth.

14. The method for production of a component from at least one first and one second layer as claimed in claim 6, wherein the surface of the decoration layer is formed from fleece, from felt, a flat cloth or from a circular knit.

15. The method for production of a component from at least one first and one second layer as claimed in claim 6, wherein the decoration layer is formed from a textile cloth, an expanded leather cloth, or a leather.

16. The method for production of a component from at least one first and one second layer as claimed in claim 6, wherein the decoration layer is formed from textile materials, a foam and a fleece material.

17. The method for production of a component from at least one first and one second layer as claimed in claim 6, wherein the support layer is formed from natural fibers, glass fibers, plastic fibers and/or polypropylene fibers.

18. An apparatus for production of a component from at least one first layer and one second layer with a molding tool which determines the contour of the component to be produced, with at least one first tool part which faces the first layer and has a three-dimensional molding contour and one second tool part which faces the second layer and has a three-dimensional molding contour, which tool parts are clamped in a pressure transducer in order to bring about the molding of the first layer and of the second layer and the connection of the two layers to each other by moving the first and the second tool parts together, and with a clamping frame device with clamping frame elements which are movable with respect to one another into a closed position in order to hold the layers outside the contour region or the tool in a predetermined manner during the molding operation, wherein the clamping frame device comprises:
a first clamping frame element which is movable relative to the first tool part by means of a first adjusting device,
a second clamping frame element which is movable relative to the second tool part by means of a second adjusting device,
a third clamping frame element which is movable relative to the first or second tool part by means of a third adjusting device and is arranged between the first and the second clamping frame elements,
wherein the first, the second and the third clamping frame elements are arranged in such a manner that a material for the first layer can be placed between the first clamping frame element and the third clamping frame element, and a material for the second layer can be placed between the second clamping frame element and the third clamping frame element, and therefore the layers can be held separately from each other by means of the third clamping frame element, such that the first layer and the second layer are able to flow relative to each other during the molding of the layers, and
wherein spacers are arranged on the third clamping frame element and are used to predetermine the minimum distance between the first and third clamping frame elements and between the second and third clamping frame elements, said spacers being configured so that they do not contact front or back surfaces of the layers during molding of the layers.

19. The apparatus for production of a component from at least one first layer and one second layer with a molding tool which determines the contour of the component to be produced, as claimed in claim 18, wherein the spacers are adjustable.

20. The apparatus for production of a component from at least one first layer and one second layer with a molding tool which determines the contour of the component to be produced, as claimed in claim 18, wherein a cutting device for cutting off an excess length of the first layer, which excess length emerges from between the first and the second tool parts, is arranged on the first clamping frame element.

* * * * *